No. 874,505. PATENTED DEC. 24, 1907.
J. J. HEYS.
SOLE ROUNDING MACHINE.
APPLICATION FILED OCT. 23, 1905.

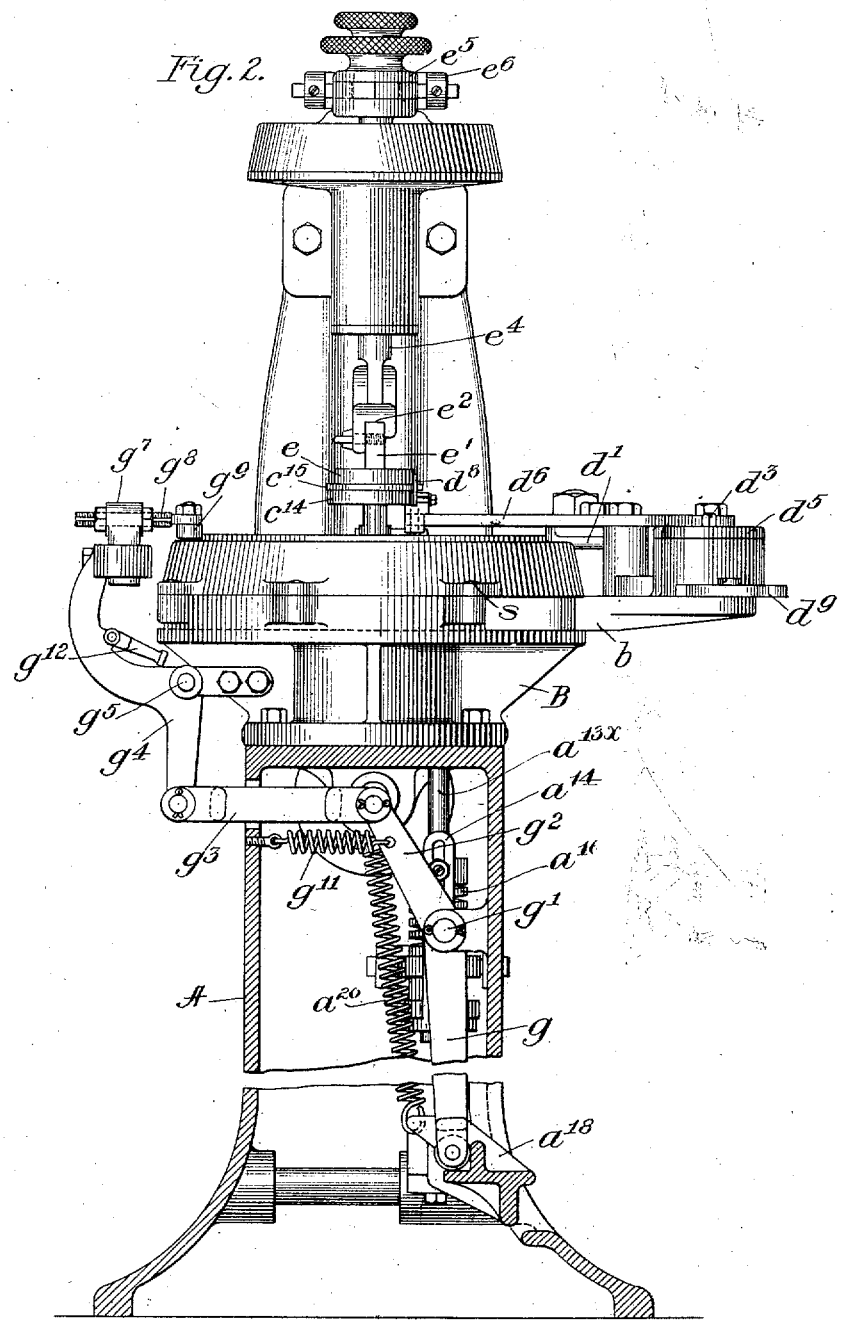

9 SHEETS—SHEET 3.

Witnesses:
Horace H. Crosman
Everett S. Emery

Inventor:
John J. Heys.
by Emery, Booth, Powell
Att'ys

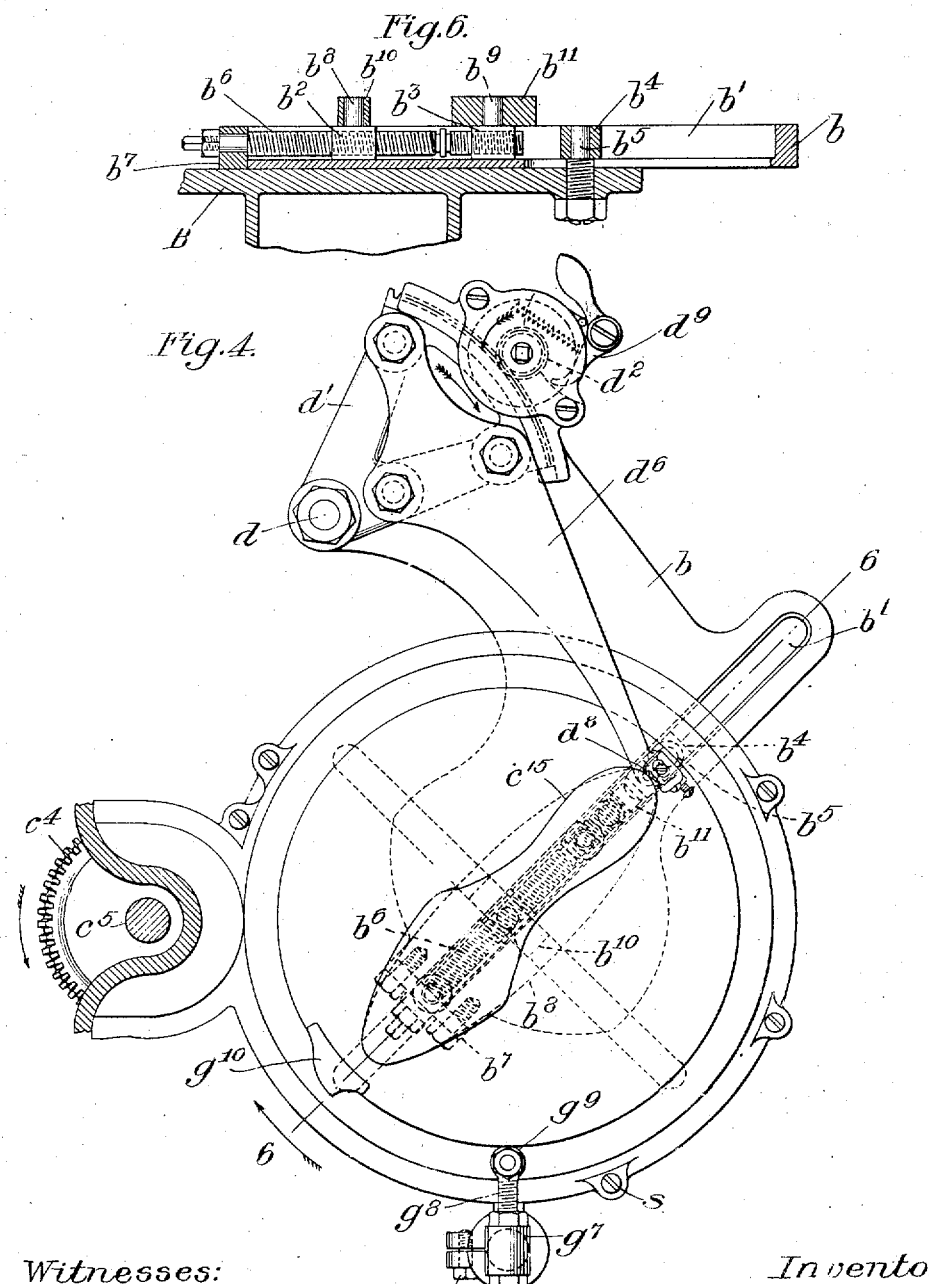

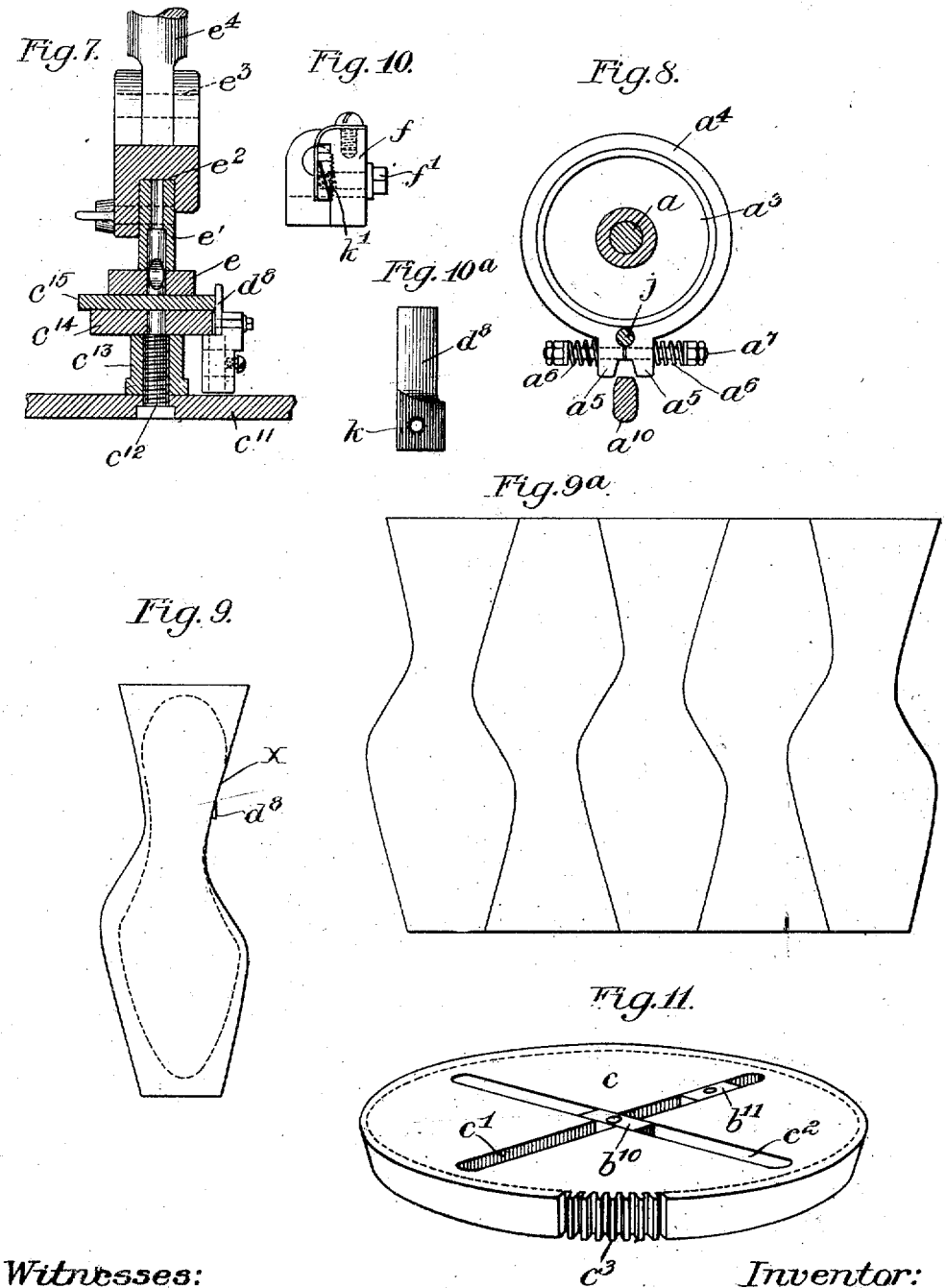

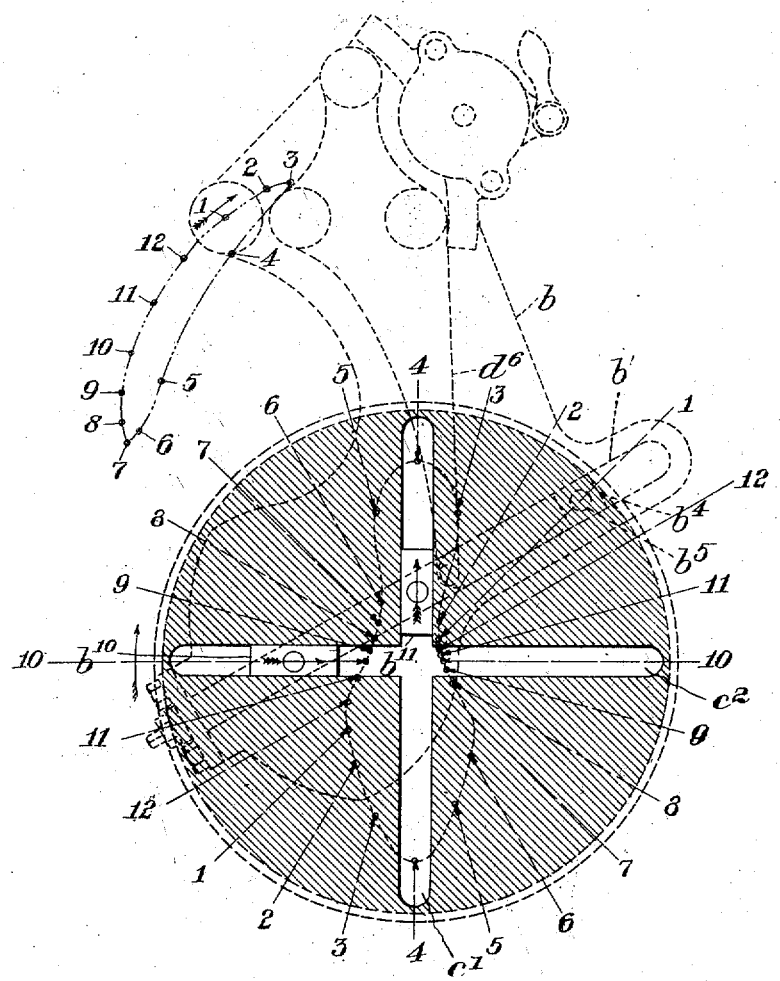

No. 874,505. PATENTED DEC. 24, 1907.
J. J. HEYS.
SOLE ROUNDING MACHINE.
APPLICATION FILED OCT. 23, 1905.

9 SHEETS—SHEET 7.

Witnesses:
Horace N. Crossman
Everett S. Emery

Inventor:
John J. Heys
by Emery, Booth, Powell
Att'ys

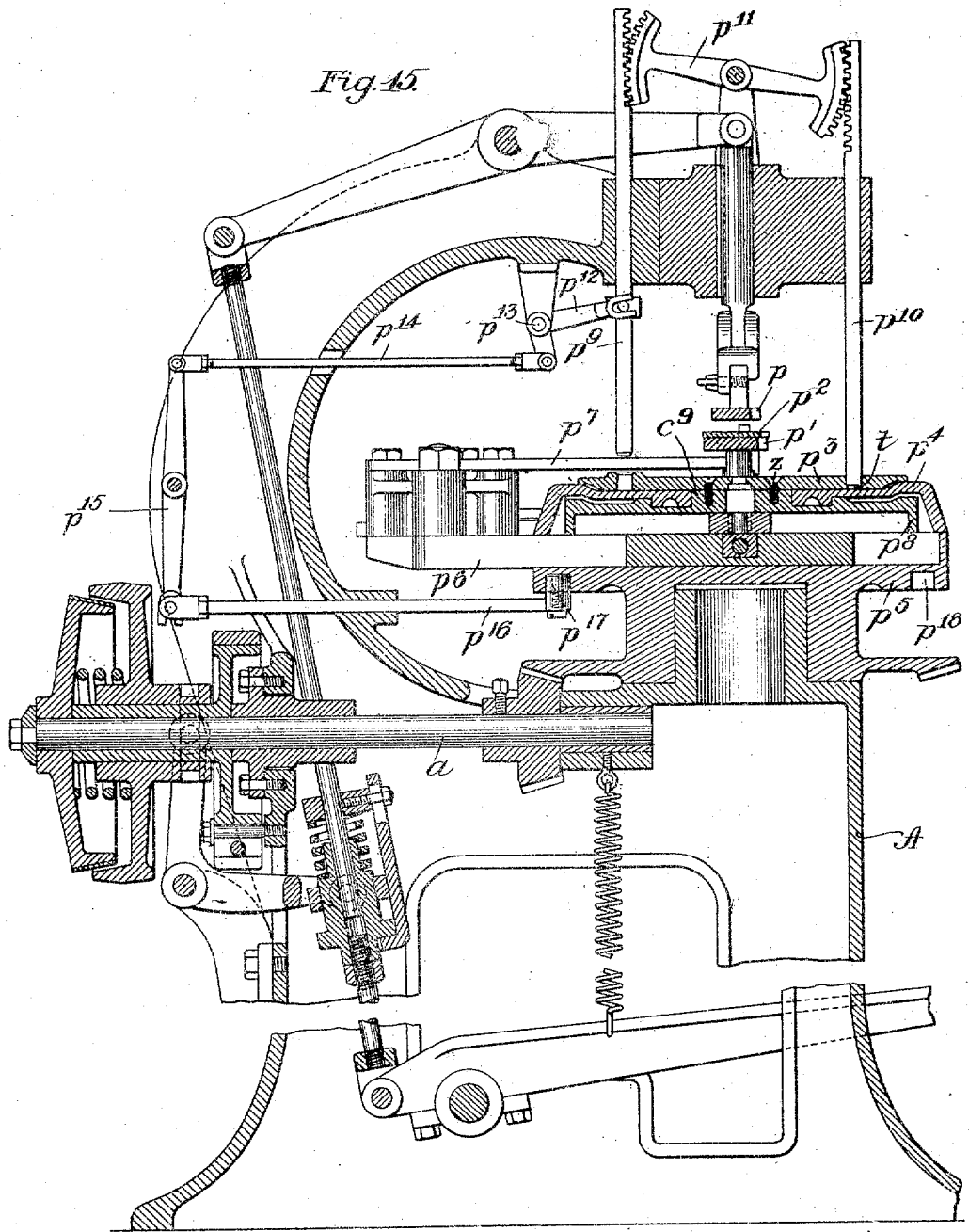

UNITED STATES PATENT OFFICE.

JOHN J. HEYS, OF LYNN, MASSACHUSETTS, ASSIGNOR TO MANUFACTURERS MACHINE COMPANY, OF MONTCLAIR, NEW JERSEY, A CORPORATION OF NEW JERSEY.

SOLE-ROUNDING MACHINE.

No. 874,505.      Specification of Letters Patent.      Patented Dec. 24, 1907.

Application filed October 23, 1905. Serial No. 283,912.

*To all whom it may concern:*

Be it known that I, JOHN J. HEYS, a citizen of the United States, residing at Lynn, in the county of Essex, Commonwealth of Massachusetts, have invented an Improvement in Sole-Rounding Machines, of which the following description, in connection with the accompanying drawings, is a specification, like letters on the drawings representing like parts.

This invention relates to machines for shaping the soles of boots and shoes to the approximate final form desired upon the completed boot or shoe. Machines of this type are known in the art as sole rounding machines and are designed to operate upon a roughly shaped sole generally, though not necessarily, having square ends, termed a sole blank, the machine in its operation rounding the ends and otherwise shaping the blank to the desired form.

The object of the present invention is to improve the general character of such machines, simplify the construction thereof, and provide for more effective operation upon the work all of which will more fully hereinafter appear.

To the accomplishment of this object and such others as will be readily understood by those skilled in the art, the invention comprises the features and combination of parts hereinafter described and pointed out in appended claims.

The various features thereof will be best understood from a description of one embodiment thereof, such for instance as illustrated in the accompanying drawings.

Figure 1:
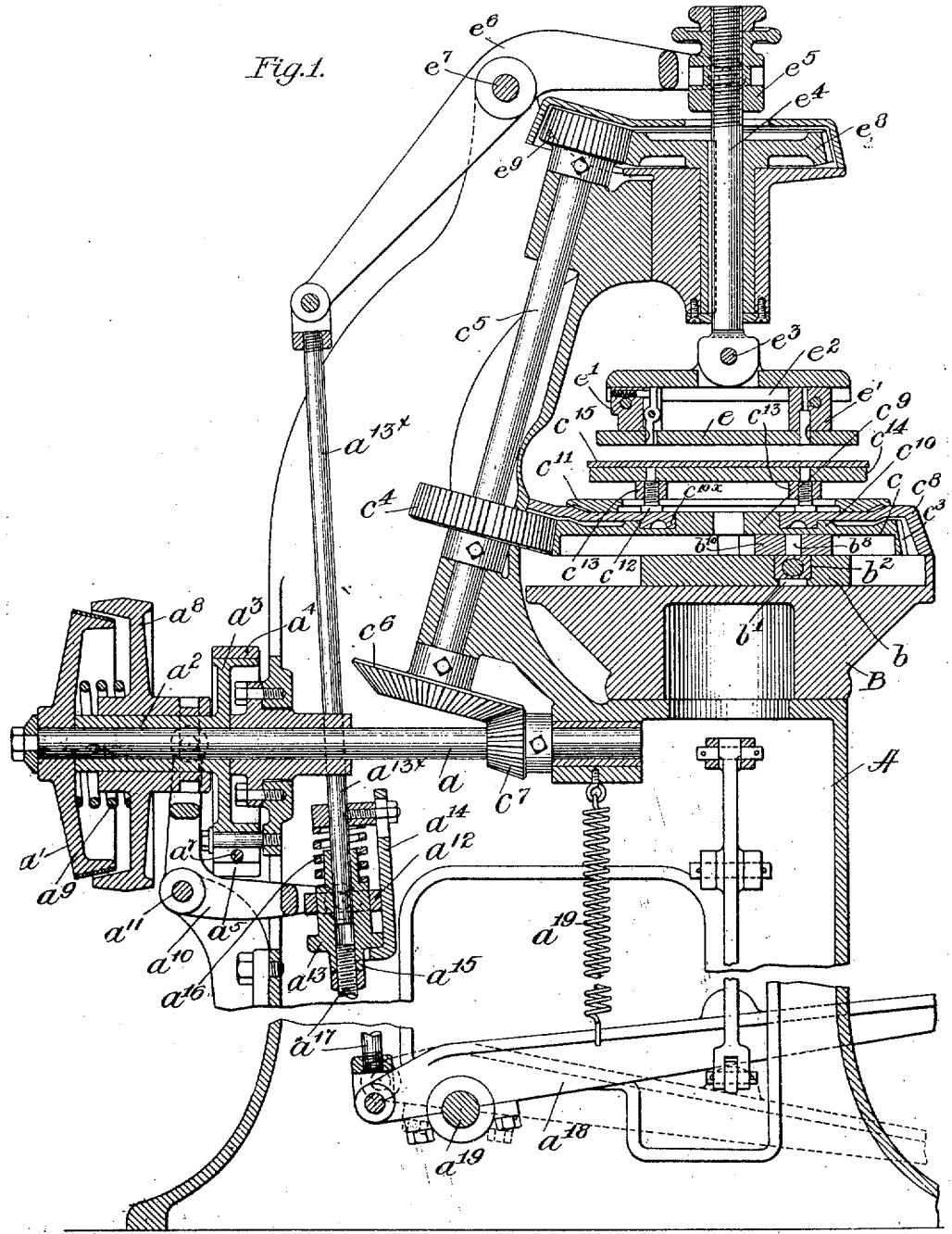
Figure 5:
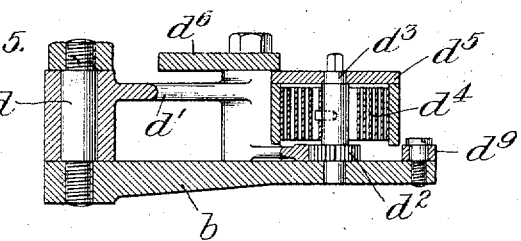
Figure 3:
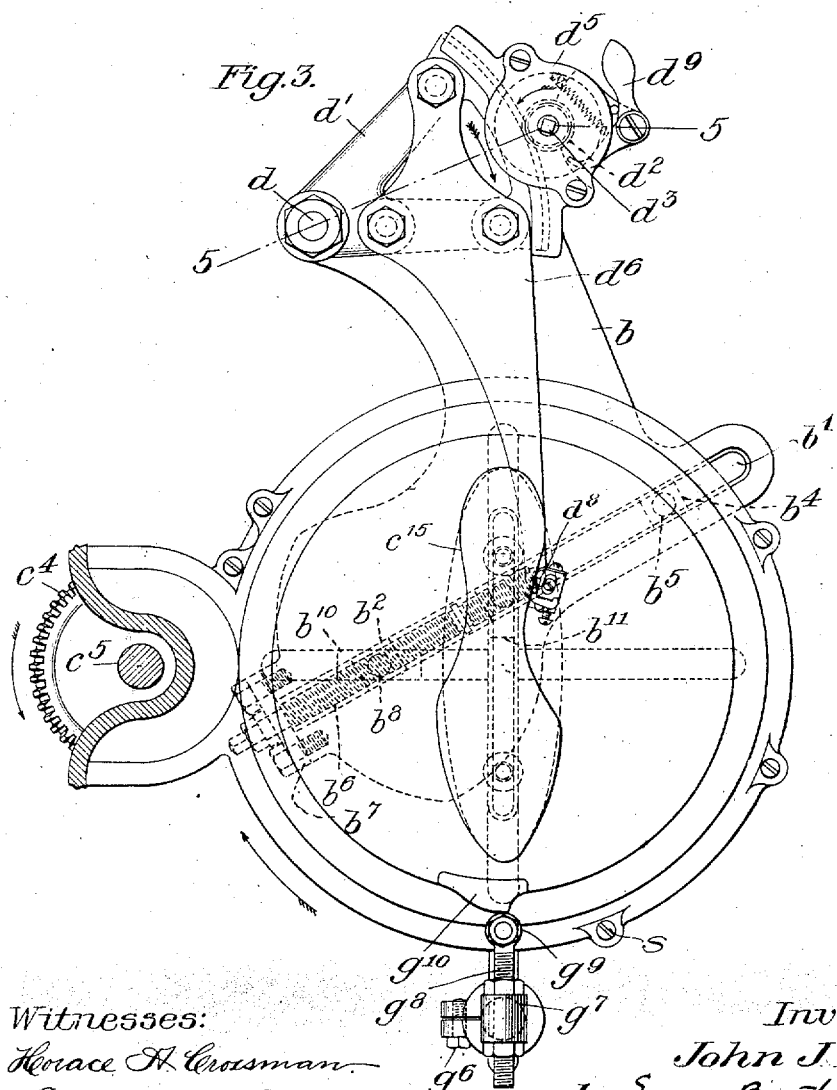
Figure 13:
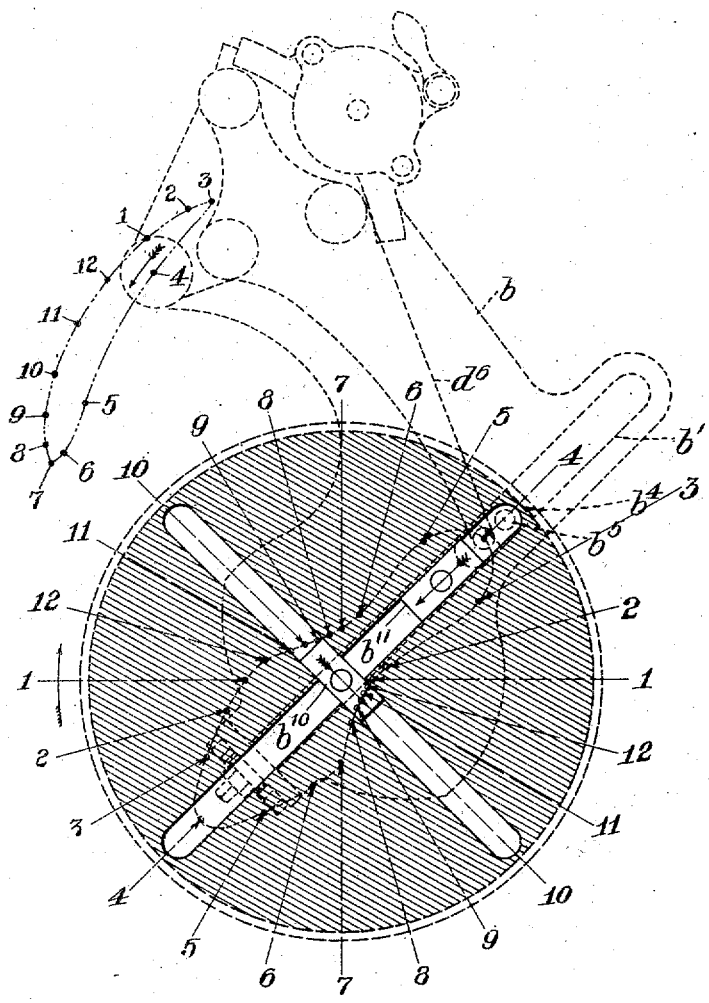
Figure 14:
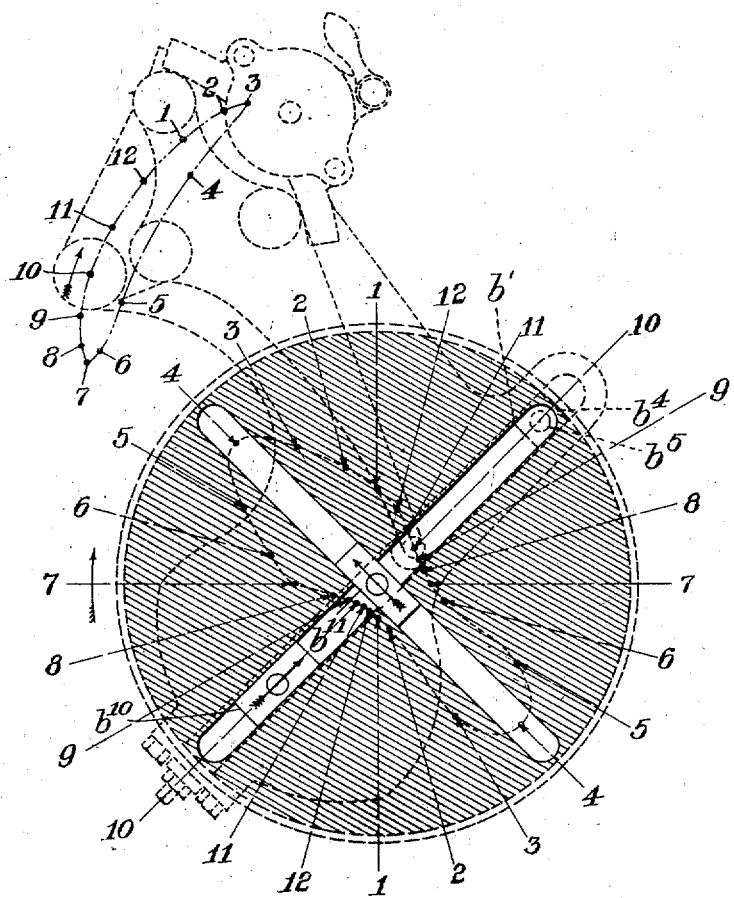

Referring to the drawings,—Figure 1 is a vertical front to rear section, illustrating the machine selected for illustration herein; Fig. 2 is a front elevation of the machine shown in Fig. 1 with the base or supporting column in section; Fig. 3 is a plan view and partial section looking down upon the work support, the knife, its support, and its controlling means. Fig. 4, a similar view showing the parts differently positioned; Fig. 5, a sectional detail on line 5—5 of Fig. 3, showing the spring mechanism for holding the knife to its work; Fig. 6, a sectional detail on the dotted line 6—6, Fig. 4, illustrating the means for adjusting the machine for different sizes of soles; Fig. 7, a vertical sectional detail showing the relative positions of the work support, its work presser, and the knife; Fig. 8, a detail showing the brake employed for stopping the machine always at a predetermined point; Fig. 9, a diagrammatic view illustrating the positioning of the work relative to the then stationary knife; Fig. 9ᵃ, a diagrammatic view illustrating the method of cutting blocked soles from the strip leather; Fig. 10, a detail illustrating the means for holding and adjusting the knife or cutter; Fig. 10ᵃ, a detail illustrating the knife employed; Fig. 11, an inverted perspective illustrating the arrangement of slide blocks in the rotatable head forming part of the rounding mechanism; Figs. 12, 13 and 14, diagrams, illustrating the action of the grooved head and blocks that control the knife only a few of the gear teeth being shown; Fig. 15, a view similar to Fig. 1, but illustrating a modification of my invention.

In the particular embodiment of my invention selected for disclosing my invention and shown in Figs. 1 to 11, inclusive, referring first to Figs. 1 and 2, the frame A will be of any suitable or desired shape and construction, it being provided, as herein shown, with bearings for a horizontal drive shaft $a$, having fast on its rear end the friction clutch member $a'$. Fast on the said shaft in front of said clutch member is the long hub $a^2$ of the brake wheel $a^3$, surrounding which (see Fig. 8) is the band brake $a^4$, secured to the frame by a bolt $j$. The band is provided with flaring ends $a^5$, normally pressed one toward the other to cause the band to grip the brake wheel by springs $a^6$, carried on a through and through rod $a^7$. Loosely journaled upon the long hub $a^2$ referred to, see Fig. 1, is the movable clutch member $a^8$, shown as a belt pulley and normally separated from the stationary clutch member by a spring $a^9$. The hub of the said movable clutch member is circumferentially grooved to receive the forked end of a bell crank operating lever $a^{10}$ (Fig. 1), fulcrumed at $a^{11}$ in the frame and having its other end also forked and pivotally connected with a collar $a^{12}$, fast on the head $a^{13}$, mounted to slide upon the lower end of the upright presser rod $a^{13\times}$. Adjustably secured upon this rod is the depending finger $a^{14}$, inturned at its lower end and forked to embrace the boss $a^{15}$ on the under side of the said head $a^{13}$, a spring $a^{16}$, being interposed between the said head $a^{13}$ and the rod block to which said depending finger is attached. This spring acts normally to keep the said head pressed tightly down upon the inturned end of said finger and permits a lifting movement of the said head relative to the said rod upon compression of the spring. Threaded in the bottom of the head $a^{13}$ (Fig. 1) is the treadle rod $a^{17}$, jointed at its lower end to the short arm of the treadle lever $a^{18}$; the treadle lever being loosely mounted upon the treadle shaft $a^{19}$ and suitably secured, preferably by casting, in the frame. Depression of this treadle acts first to lift the head $a^{13}$, and through its spring $a^{16}$ also to lift the presser-rod $a^{13\times}$, to clamp the work by means to be described. When the work has been clamped and further upward movement of the presser-rod $a^{13\times}$ is impossible, continued upward movement of the treadle rod $a^{17}$ causes the said sliding head $a^{13}$ to compress the spring $a^{16}$ and have a sliding movement on and relative to the now stationary presser-rod $a^{13\times}$, thereby causing the bell crank operating lever $a^{10}$ to engage the two clutch members to start the machine. As this bell crank operating lever is thrown to the left (Fig. 1), to start the machine, its horizontal arm enters between the flaring brake ends $a^5$ (Fig. 8) and separates the latter to release the brake just prior to clutching engagement of the clutch members. When the treadle is released to stop the machine and is drawn upward by the spring $a^{20}$ (Fig. 1), the first movement is the release of the clutch members, then and immediately thereafter the application of the brake; this taking place mainly under the action of the spring $a^{16}$, after which continued return of the treadle mechanism permits the presser-rod $a^{13\times}$ to drop and release the work.

Upon the frame at its front side is the rounding head B (Figs. 1 and 2), preferably detachable from the main frame both for convenience of manufacture and for repair. The top face of this rounding head is smooth and flat, to furnish a substantial bearing surface for the horizontally movable or gyratory knife carrier or head $b$, shown separately in Fig. 6. This knife carrier (see Figs. 3 and 4) is provided with a long slot $b'$, in which slide two block carriers $b^2$, $b^3$, shown best in Fig. 6. In the right end (Fig. 6) of this same slot is positioned a fulcrum block $b^4$, loosely mounted upon a fulcrum pin $b^5$, fixedly mounted on the rounding head B. The two block carriers $b^2$, $b^3$, are respectively threaded internally to receive the double threaded adjusting screw $b^6$ (see Fig. 6) mounted at its left end in a plate $b^7$, secured to said carrier $b$, said plate forming a cap to close the end of the slot $b'$, and also preventing endwise movement of the double screw while permitting free rotation of the latter by its squared outer end. One of the threads, preferably a right-hand double thread, engages the block carrier $b^2$, and is relatively high pitch, say six to the inch; while the other thread, also preferably a right-hand thread, engages the block $b^3$, and is relatively low pitch, for instance twenty-four to the inch; so that rotation of the said screw will cause said block carriers to be moved toward and from each other at varying speeds to cause a peculiar size adjustment that will be better understood later in this description. The block carriers $b^2$, $b^3$, carry respectively the studs $b^8$, $b^9$, upon which are loosely mounted the slide blocks $b^{10}$, $b^{11}$, which are mounted to slide respectively in the right-angled intersecting slots of a rotatable head $c$ (shown inverted in Fig. 11), the slots of said head being marked respectively $c^2$, $c'$. This head $c$ is opposed to and supported by the head $b$, and the one is slidable on the other. The slotted head $c$ is provided with a gear $c^3$ (Fig. 1) slightly beveled and driven by a correspondingly beveled gear $c^4$ on the upwardly inclined shaft $c^5$, journaled in the frame. This shaft $c^5$ is driven from the horizontal drive shaft $a$, by a pair of beveled gears $c^6$, $c^7$, mounted respectively on the said shafts.

For closing and covering the driving gear $c^3$ a gear cover $c^8$ is provided, which is formed centrally to receive and constitute a bearing for the upwardly extended gear wheel head or hub $c^9$, while the said gear itself is provided with an upwardly extended ring-like rib $c^{10}$, bearing upon and confined by a depending rib $c^{10\times}$ on the said gear cover. The gear cover or casing $c^8$ is secured to the stationary head B by any suitable means, as screws $s$, and provides a fixed bearing for the geared head $c$ by means of the circular opening and hub, so that the only possible motion of the head $c$ is a rotary one. The gear casing also holds the geared head $c$ down upon the carrier $b$, upon which it is slidably supported by the blocks $b^{10}$ and $b^{11}$. Both the head $c$ and the carrier $b$ are thus movably supported and confined between the gear casing $c^8$ and the stationary head. Removably secured to the hub $c^9$ is a work supporting plate $c^{11}$, slotted transversely to receive the headed adjusting pins $c^{12}$, surrounded by thimbles $c^{13}$, (Figs. 10 and 10$^a$) which latter carry the work support $c^{14}$, upon which is mounted the pattern $c^{15}$ of metal, wood, or other material, as desired, both the work and pattern support being alined with the slot $c'$ of the rotatable head $c$ (see Figs. 12 and 14). These pins $c^{12}$ may be adjusted in the slot referred to, to accommodate work supports and patterns of different lengths.

Referring now to Figs. 3 and 4: the knife carrier $b$ is extended beyond the circumference of said gear case $c^8$ and has pivoted to it at $d$ a segmental gear $d'$, engaged at its periphery with a pinion $d^2$ upon the spring shaft $d^3$ (see Fig. 5). To this spring shaft is attached the inner end of a coil or spring $d^4$ attached at its outer end to the interior wall of a spring case $d^5$, rigidly secured to said knife carrier $b$. To the segmental gear $d'$ is secured the knife carrying arm $d^6$, carrying at its end the obliquely arranged knife holder $d^7$, in which is adjustably held the knife $d^8$. The knife $d^8$ is provided at its base with corrugations $k$, which are adapted to fit similar corrugations $k'$ in the side of the holder $f$, to which it is clamped by the bolt $f''$. This construction furnishes means for adjusting the knife on its holder and for holding it rigidly in adjusted position. The action of the spring $d^4$ through its pinion $d^2$ is to swing the segmental gear $d'$ in the direction of the arrow thereon (Figs. 3 and 4), thereby causing the knife holder at the free end of said arm $d^6$ to be pressed yieldingly against the edge of the pattern $c^{15}$, and to follow the varying contour of the latter as said pattern is revolved past it, to cut the block or blank sole clamped thereto to the exact size and shape of the pattern used. The tension of the knife holding spring $d^4$ may be adjusted by turning its spindle $d^3$ by a wrench applied to the squared end thereof, after its pinion is engaged with the segmental gear $d'$. To lock the pinion against rotation, thereby to hold the knife arm and its knife fixedly in position at any time, as, for example, to permit of a change of patterns, I have provided the spring case with a spring controlled dog $d^9$, which may be thrown into engagement with the teeth of the pinion $d^2$, to lock the same against rotation under the action of the spring, the tendency of said pinion to rotate acting the more firmly to lock the dog with its teeth and against the action of the spring shown, which tends to throw the dog into inactive position. The blocks $b^{10}$ and $b^{11}$ are always inclined and positioned within a segmental area of 90° of the rotatable slotted head $c$ and the rotation of said head would, if the block carriers were unrestrained, cause said blocks $b^{10}$ and $b^{11}$ and the knife carrier to also rotate. The knife carrier, however, is restrained from rotation, although it is free to slide and swing on its fulcrum pin $b^5$ in the slot $b'$; consequently, as the slotted head $c$ rotates the blocks $b^{10}$ and $b^{11}$ partake only partially of the movement thereof, the balance of said movement causing said blocks to slide back and forth from right to left and from front to back in the intersecting slots of said head. As these blocks $b^{10}$ and $b^{11}$ thus slide in the slots of the head $c$, the block carriers $b^2$ and $b^3$, give to the knife carrier to which they are attached a combined in and out and from front to back swinging movement or a sort of four-motion or elliptical movement that causes the knife on the end of said carrier to describe an irregular ellipse that approximates closely the shape of a shoe sole even without the aid of a pattern.

It is of course desirable in a machine of this type that the natural movements of the knife describe as nearly as possible the outlines of a typical sole to be trimmed or rounded, so that the modification of knife movement by the pattern and which is provided for by yieldingly supporting the knife carrier, shall be as little as possible; it having been found that the rounding is inaccurate and otherwise difficult to obtain where the yielding support of the carrier is relied upon for any considerable variation in knife travel from a truly circular path. It has also been found desirable in machines of this type that the cutting action proceed slowly about the relatively sharp ends of the sole at the toe and heel thereof, and it is desired that they shall proceed rapidly along the sides of the sole where the variation from an approximately straight line is least.

The mechanism illustrating my invention provides for both these desirable features, and to facilitate an understanding of this, I have provided a series of diagrammatic views illustrating the various positions and the various speeds of movement of the sole and cutter one relative to the other. In studying these, however, it must be borne in mind that they are merely diagrammatic for the purpose of enabling the principle of operation to be understood and may not be relied upon as accurate representations of the parts in their various positions, nor as indicating with absolute accuracy the outlines of movements of the parts. The figures are intended to illustrate with substantial accuracy what is above referred to, and have been plotted as nearly as has been practicable.

Referring first to Figs. 3 and 12: The parts are shown in plan view and diagram in the positions in which they will be found upon starting the machine. The pattern is shown in full lines (Fig. 3) and in dotted lines (Fig. 12) with the cutter in position on the right side and just forward of the heel. The circle indicating the outline of the slotted head in Fig. 12 has for convenience been divided into two series of spaces or intervals numbered respectively from 1 to 12; the divisions being equal and representing in the following explanation, regular distances of rotation of the pattern and machine head, one relative to the other. In the upper left-hand portion of the figure is an irregular and elliptically shaped path indicated by the long double dot and dash lines and on which are indicated various intervals numbered from 1 to 12. This irregularly shaped path indicates the travel of the free end of the knife carrier during one-half a rotation of the pattern, and the numbered intervals thereon, which, it will be seen, vary in length, indicate the travel of that end of the knife carrier upon rotation of the pattern during the correspondingly numbered but equal intervals indicated thereon.

Examining now, the diagram (Fig. 12)

and assuming that the cutter is in the position marked 1 of the diagram, if the pattern be turned to the right, as indicated by the arrow, through an angle indicated by the interval 1—2, the outer end of the knife carrier will likewise move through an interval represented on the irregular path by 1—2, which direction, it will be seen, is from left to right, or opposite the direction of travel of the pattern, which is at the side at which the knife is located generally from right to left, thus causing an increase in the speed at which the cutting takes place, as compared with the speed of cutting if the knife remains stationary and did not move opposite to the pattern. During the next interval of movement of the pattern from 2 to 3, the free end of the knife carrier on its path moves from 2 to 3, which is an interval less than the first interval 1—2. Inasmuch as the interval 2—3 on the pattern is much longer than the interval 1—2 thereon, the shorter interval 2—3 of the irregular path of the knife carrier is more than offset, so that the same or a greater speed of cutting results. Turning the pattern now through a further angle represented by the numerals 3—4, would bring it into the position indicated in Figs. 4 and 13 with the cutter fairly against the end of the pattern and during such movement the free end of the knife carrier would have reversed its direction of travel and moved from 3 to 4 on the carrier path, as indicated on Figs. 12 and 13.

By comparing Fig. 13 with Fig. 12, it will be seen that the carrier receives at this point only a slight swinging movement about the fulcrum pin $b^5$ as a fulcrum which causes the knife in effect to dwell, since the radial distance and the arc through which the knife carrier swings is less than when the knife is traveling along the sides of the sole, consequently in rounding the heel it will be seen that a very slow cutting movement results. During further rotation of the heel end of the pattern from 4 to 5, past the cutter, the free end of the knife carrier travels from 4 to 5 on its indicated path, producing a continuance of the swinging movement of the carrier to cause the same slow movement to continue rounding the second quarter of the heel from 4 to 5. In the further rotation of the pattern from the position Fig. 13 to that Fig. 14, it will be seen that the free end of the carrier continues its swing to the point 7 and back again to the point 10 to cause the knife to have a movement inward and outward to follow the natural outline of the sole along the shank, but leaving it relatively stationary, so far as the feed is concerned, or, moving if at all, in a direction opposite that of the pattern to increase the feed along the side of the shoe. In further rotation of the pattern from the position Fig. 14, to a position corresponding with that of Fig. 12, but with the toe pointing upward instead of downward, the carrier end moves to its starting position, marked 1, while the knife occupies a position also at 1, but this time bearing against the opposite side of the sole from that at which it started. The pattern has now turned through one-half a rotation and one side has been cut, the free end of the knife carrier, however, having completed one circuit of its line of travel. Continued rotation of the pattern to round the opposite side of the sole, causes the knife carrier to traverse a second time its indicated path on the diagrams to give it the same rapid cutting movement along and in and out at the shank on the opposite side of the sole and the same sole cutting and swinging movement about the toe end thereof. It will thus appear that the mechanism described and illustrating my invention, gives naturally, and without the aid of a pattern, a line of travel that very closely approximates a typical sole, and that the only modification or variation therefrom is what is necessary to adapt it to the slight changes from a typical sole that are necessary to accommodate varying styles of lasts employed. By adjusting the blocks $b^{10}$, $b^{11}$ nearer to each other the width of the approximate ellipse along which the knife travels, is narrowed; and thus adjustment may be such as to cause the knife to travel practically in a straight line; while by separating the said blocks, the ellipse is widened and made to approach a circular outline for very wide soles. These adjustments cause one of the blocks, namely, that marked $b^{10}$, to travel further in either direction than the other block $b^{11}$, because of the difference in pitch of the threads upon the screw $b^6$ (Fig. 6), so that when the blocks are brought nearer together, for a narrow sole, the ellipse is also shortened; and when they are separated for a wider sole, the ellipse is also lengthened; and the proportions are such that these variations approximate the lengths and widths of standard sizes of soles. It will further be seen that by causing the knife to thus move naturally and without the aid of a pattern in approximately the elliptical path required to round a sole, the work devolving upon the pattern is very much lessened; the knife carrier spring may therefore be lightened and the error that inevitably results from requiring a spring by its yield to transform the rotary motion of its carrier to the approximately elliptical path of the pattern, is reduced to a minimum.

Referring now to Fig. 1: Immediately over the pattern $c^{15}$ is the presser $e$, the same being carried upon the under sides of two presser blocks $e'$, radially adjustable in the presser carrier $e^2$ pivotally connected at $e^3$, with the bottom end of the vertical presser spindle $e^4$, mounted to rotate and also to slide vertically in the overhanging arm of the machine frame.

The end of the spindle to which the presser carrier is pivoted, is rounded so as to enable said presser to be rotated by and with the vertical spindle $e^4$, yet permit it to rock on its said pivot to adjust itself firmly to and upon the sole blank that is clamped between the presser and the pattern. Upon the top end of the presser spindle $e^4$ is threaded the adjustable nut $e^5$, circumferentially grooved to receive the forked short arm of a presser lever $e^6$, fulcrumed at $e^7$ in the frame and having its opposite long arm jointed to one end of the presser rod $a^{13\times}$. It will now appear how the upward movement of the said presser rod $a^{13\times}$ upon depression of the foot treadle, causes the presser spindle to be depressed, thereby to bring the presser into firm holding contact with a sole blank placed upon the pattern $c^{15}$. Splined upon the presser spindle $e^4$ is the hub of a slightly beveled gear wheel $e^8$, driven by a correspondingly beveled pinion $e^9$, fast on the top end of the upwardly inclined shaft $e^5$. Rotation of the main shaft $a$ thus not only rotates the slotted head $c$, to produce the movements described of the knife carrier and rotation of the work table and pattern, but also rotates the presser in unison with the work support and pattern so that the said work, the presser above it, and the pattern and work support beneath it, rotate as a unit in unison with the beveled gear $c^3$ upon the slotted head $c$, thus carrying the edge of the sole past the knife $d^8$, causing the latter, which is always pressed against the edge of the pattern, to trim or round the sole blank to the shape of the said pattern.

With my machine the workman is able to stand close to the sole that is being trimmed or rounded without any large table in front of him, and there is no complicated mechanism swinging in a circle in front of him, as with the knife carrying and controlling devices of the "Julian" type of machine. On the contrary, with my machine the gyrating knife holder remains at one side or at the back of the machine with reference to the operator, who has nothing swinging in front of him to catch any clothing and cause any damage. Furthermore, while in the "Julian" type of machine the cutting action progresses around the periphery of the stationary sole, making it difficult for the operator to follow it with his eye and detect any imperfection in the cutting until after the sole has been completely rounded and removed, in my machine the cutting takes place always at substantially one and the same point upon which the operator's eye may be riveted, the work passing that point as the cutting progresses. By rotating the presser as well as the work support, all danger of the slip of the sole upon the supporting surfaces is eliminated.

When the treadle is depressed to start the machine, see Fig. 2, it is caught and held in its depressed position by a lock lever $g$, depending from a fulcrum $g'$ on the frame and having its upwardly extended arm $g^2$ connected by a link $g^3$ with the depending arm of a lever $g^4$ fulcrumed at $g^5$ also on the frame. The upper end of this lever $g^4$ has a split socket to receive and hold, by means of the clamping screw $g^6$, the stem of an eye bolt $g^7$ (Figs. 2 and 3). This eye bolt has adjustably clamped in it the threaded rod $g^8$ carrying at its end a cam roller $g^9$ adapted to be engaged at the proper time by a cam $g^{10}$ (see Figs. 3 and 4). The lock lever $g$ (Fig. 2) is yieldingly pressed to the right to engage and lock the treadle in its lowest position by a spring $g^{11}$.

When in the rotation of the rounding mechanism, the sole has been completely rounded, the cam $g^{10}$ (Figs. 3 and 4) reaches the cam roller $g^9$ and throws the same outward, thereby through the mechanism described (Fig. 2) throwing the locking lever $g$ to the left to release the treadle and permit the latter to assume its elevated position, releasing the work and stopping the machine. While the rounding is in progress, however, the clamp and clutch mechanism is held in operative position, and what is more important, the work is held clamped quite independently of the operator, so that no lack of attention on his part can effect release of the work until the rounding has been completed. To enable the machine to be operated by hand, whether adjusting or testing it,—in other words, to render it non-automatic, I have provided the lever $g^4$ (Fig. 2) with a holding dog $g^{12}$, which, when the said lever at its upper end is thrown to the left, may be interposed as a strut between the lever and the head, there to hold it and to prevent the treadle being locked until again released.

In Fig. 9 I have shown in full lines a typical block sole, such as received in quantity by the shoe manufacturers and from which the sole is to be rounded to pattern shape and size. These block soles usually present at about the point $x$ (Fig. 9), a fairly uniform oblique edge; in other words, as ordinarily blocked, the two sides of the fore part are substantially uniformly inclined relative to the longitudinal median line of the sole, so that whether the sole be a right or a left, the inclination of the edge at the point $x$ is substantially the same, though of course the length of the edge varies according as the sole is a left or a right. I have also found by comparative tests that the desired sole shape at the point $x$ usually coincides for a greater or less distance, substantially with the block edge at the same vicinity, so that in rounding the block sole to the desired shape little or no cutting action is necessary in the vicinity of the point $x$. I avail myself of this coincidence to start the cutting mechanism in the vicinity of the point $x$; in other words, the machine comes to rest at about the point $x$, and in positioning the sole upon the pattern before it is clamped, the operator presses the part $x$ of the sole blank against the edge of the cutter and then clamps the sole. When the machine is started from this position of the cutter, the sole passes the cutter for a considerable distance, say from half an inch to an inch and a half, without any cutting. I am thus enabled to dispense with the retrograde or recovering movement of the cutter which is provided in the "Julian" type of machine to insure the cuts overlapping at the beginning and end of the cutting movement, for, arranged as above described, the sole travels some distance after its first start before the cutting action commences, and the cutting action ends before the sole reaches its final position at rest, so that there is an appreciable distance, say from a half inch to an inch and a half where no cutting is required and in which the machine may come to rest and insure a complete rounding of the sole without any burs or uncut portions remaining. I am enabled to stop the machine in this limited distance by the clutch and brake arrangement already described. Obviously, it is immaterial whether the slotted head $c$ together with the work be rotated to cause the work to travel past the knife controlled by the slide blocks, or the work and slotted head $c$ be held stationary and the slide blocks carrying the cutter be rotated round it. In either case, the relative movements between the knife on the knife carrier and the work on the said slotted head, must, of course, be the same.

While I prefer the construction (Figs. 1 to 12, inclusive) where the work rotates past the relatively stationary cutter, because the cutter thereby does not swing past the operator and for other mechanical reasons that will be apparent to the skilled mechanic, nevertheless in Fig. 15 I have shown a machine where the work is stationary and the cutter travels around. Referring to this figure, the driving and treadle mechanism are substantially as in the construction Fig. 1. In this instance, however, the clamp $p$, does not rotate, nor does the work support $p'$ and its pattern $p^2$; they being supported upon the stationary plate cap $p^3$. In this instance, what corresponds with the gear case $c^8$ in Fig. 1 and marked $p^4$ (Fig. 13) is made to rotate, the same being mounted upon the now rotatable head $p^5$, corresponding to the head B Fig. 1.), the same being driven from the shaft $a$. This head $p^5$ and case $p^4$ carry between them the knife carrier $p^6$, and carrying arm $p^7$, upon the end of which the knife is mounted. This carrier $p^6$ receives the block carriers $b^2$, $b^3$ (Fig. 6) upon which, respectively, are mounted the slide blocks $b^{10}$ and $b^{11}$ that travel in the slotted head $p^8$ corresponding to the slotted head $c$ (Figs. 1 and 11). This head $p^8$, of course, must now be held stationary since the cutter carrier $p^6$ rotates, and to do this while holding it at the same time between the rotating members $p^6$ and $p^4$, I provide the cap plate $p^3$ with diametrically opposite holes $t$ adapted to receive the vertically movable rods or pins $p^9$, $p^{10}$ (Fig. 13). When either or both these rods engage the holes $t$ in said plate $p^3$, the latter is held fixedly and prevented from rotation with the intermediate cover $p^4$.

As the knife carrying arm $p^7$ in its rotation, reaches either of the pins $p^9$, $p^{10}$, said pin is raised to permit said arm to pass, the other pin at that time being in engagement with and to hold the said head $p^3$. To raise these pins alternately to cause them to permit passage of the said knife arm $p^7$, I have provided said pins at their open ends with racks in engagement with the segmental gears $p^{11}$, which are rocked as required to elevate and depress said pins. This rocking is accomplished through one of the pins itself, namely, the pin $p^9$, which is moved vertically by a bell crank $p^{12}$, fulcrumed at $p^{13}$, and connected by rod $p^{14}$ with a lever $p^{15}$ at the back of the machine. The lower end of the lever $p^{15}$ has connected to it one end of a rod $p^{16}$, carrying at its front end a stud and roller $p^{17}$, that travels in a cam slot $p^{18}$, on the under side of the head $p^5$. As the head rotates, it thus causes the pins $p^9$, $p^{10}$ to be raised and lowered as required to maintain constant engagement between the plate and the stationary head $p^4$.

Claim.

1. A sole rounding machine comprising, in combination, a cutter; opposed cutter and work carrying heads; means for moving one head; and variable-speed transmitting mechanism intermediate the heads to cause an accelerated relative cutting movement between the heads at a portion of a sole to be cut.

2. A sole rounding machine comprising, in combination, a cutter; opposed cutter and work carrying heads; means for moving one head; and transmitting mechanism intermediate the heads to impart an independent elliptical movement to the other head.

3. A sole rounding machine comprising, in combination, a cutter; opposed cutter and work carrying heads; means for moving one head; and transmitting means intermediate the heads for imparting an elliptical movement to the other head, the resultant relative movement of the two heads being accelerated at a portion of a sole.

4. A sole rounding machine comprising, in combination, a cutter; opposed cutter and work carrying heads; means for moving one head; and transmitting means intermediate the heads for causing elliptical motion of the other head, the resultant relative motion of the two heads being varyingly accelerated at different portions of a sole.

5. A sole rounding machine comprising, in combination, opposed heads; cutting means sustained by one of said heads; means for moving one head; and transmitting means intermediate the heads for causing elliptical motion of the other head, at maximum and minimum speeds in the general directions of the major and minor axes of the path of said elliptical motion.

6. A sole rounding machine comprising, in combination, a cutter; opposed cutter and work carrying heads; means for moving one head; and variable-speed transmitting means intermediate the heads for moving the other head.

7. A sole rounding machine comprising, in combination, opposed heads; cutting means sustained by one of said heads; means for moving one head; and variable-speed transmitting means for moving the other head in an elliptical path.

8. A sole rounding machine comprising, in combination, a cutter; movable opposed cutter and work carrying heads; and actuating mechanism for moving said heads including means for moving one head in an elliptical path.

9. A sole rounding machine comprising, in combination, opposed heads, a work support connected with one, a movable knife connected with the other, means for moving the work supporting head, and transmitting means intermediate said heads to impart an elliptical movement to the other of said heads.

10. A sole rounding machine comprising, in combination, opposed heads, a work support connected with one, a knife with the other, means for moving the work supporting head, transmitting means intermediate said heads to cause the knife to move independently in an elliptical orbit, and means for varying the dimensions of the elliptical orbit.

11. A sole rounding machine comprising, in combination, opposed heads, a work support connected with one, a movable knife connected with the other, means for moving the work supporting head, and transmitting means intermediate said heads to impart an elliptical movement of variable speed to the other head.

12. A sole rounding machine comprising, in combination, opposed heads, a work support connected with one, a movable knife connected with the other, means for moving the work supporting head, and transmitting means intermediate said heads to impart to the other head, an elliptical movement having alternate maximum and minimum speeds.

13. A sole rounding machine comprising, in combination, opposed heads, a work support connected with one, a movable knife connected with the other means for moving the work supporting head, and transmitting means intermediate said heads to impart to the other head, an elliptical movement having maximum and minimum speeds in the directions of the major and minor axes of the elliptical movement.

14. A sole rounding machine comprising, in combination, a work-support; cutting means; means for moving one of them; and mechanism for moving the other in a substantially elliptical path to produce a resultant relative movement on a path approximating in shape the outline of a sole.

15. A sole rounding machine comprising, in combination, a work support; cutting means; means for moving one of them in a substantially elliptical path; and mechanism to effect further relative movement whereby the cutting means is caused to describe upon the work a path approximating in shape the outline of a sole.

16. A sole rounding machine comprising, in combination, a rotary work support, and an elliptically moving knife.

17. A sole rounding machine comprising, in combination, a rotary work support, and an elliptically moving knife having variable speeds.

18. A sole rounding machine comprising, in combination, a rotary work support, a knife, a pattern, and means independent of a pattern for moving the knife in an elliptical path.

19. A sole rounding machine comprising, in combination, a rotary work support, a knife, a pattern, and means independent of a pattern for moving the knife positively in an elliptical path.

20. A sole rounding machine comprising, in combination, a head; a work holder supported thereby; means to rotate the head; a knife; and means to produce from a rotary motion of the head an elliptical motion of the knife at varying speeds.

21. A sole rounding machine comprising, in combination, a work-supporting head; means to rotate the head; a knife; and means to produce from rotary motion of the head an elliptical motion of the knife at maximum and minimum speeds in the directions of the major and minor axes of the elliptical motion.

22. A sole rounding machine comprising, in combination, a head; means for rotating the head; a knife; and means controlled by rotary motion of the head for positively moving the knife in an elliptical path at maximum and minimum speeds in the directions of the major and minor axes of said path.

23. A sole rounding machine comprising, in combination, a head; means for rotating the head; a knife; and means controlled by rotation of the head for positively actuating independent motion of the knife in a substantially elliptical path at maximum and minimum speeds in the directions of the major and minor axes of said path.

24. A sole rounding machine comprising, in combination, a rotary work supporting head; a knife carrier; and transmitting means to translate rotary motion of the head into motion of the knife in an elliptical path at variable speeds.

25. A sole rounding machine comprising, in combination, a knife; means to present the work to the knife; and mechanism for moving the knife at variable speeds while restraining the knife against movement around the work.

26. A sole rounding machine comprising, in combination, a work support; a tool to act on the sole; means to move the work to present it to the tool; and means to impart cutting movement to the tool in different directions while cutting, including a direction opposite that in which the work is moved.

27. A sole rounding machine comprising, in combination, a moving work support; pattern means; cutting means; means for moving the cutting means in an elliptical path; and means to permit the cutting means to coöperate with the pattern means during movement of the knife and the work support.

28. A sole rounding machine comprising, in combination, a work supporting head, a knife carrier, means for rotating the work supporting head, mechanism intermediate the head and carrier to cause the knife carrier to move in an elliptical path in opposite direction to that of the rotation of the head.

29. A sole rounding machine comprising, in combination, two heads, a knife connected with one, a work support connected with the other, and means connecting said heads for causing the motion of one of said heads to produce a sliding motion of the other relative to the former.

30. A sole rounding machine comprising, in combination, two heads, a knife connected with one, a work support connected with the other, means for rotating the work supporting head and means connecting said heads to cause the rotation of the work supporting head to produce a sliding motion of the other head relative thereto.

31. In a sole rounding machine comprising a stationary head, a slotted head, and means to rotate it, an opposed head, a knife connected with the opposed head, a work support connected with the slotted head, blocks connected to the opposed head and slidable in the slotted head, and a fulcrum block movably connected to the opposed head and pivoted to the stationary head to move the knife in an elliptical path.

32. A sole rounding machine comprising opposed slotted heads, a knife connected with one, a work support with the other, connecting blocks slidable in the slots of the heads, a fulcrum block movable in one of the slots and pivoted to a stationary part of the machine, and means to move one of the heads to produce relative motion between them.

33. A sole rounding machine comprising opposed slotted heads, a knife connected to one, a work support to the other, means for rotating the head to which the work support is connected, connecting blocks movable in the slots of the heads, a fulcrum block movable in a slot of one of the heads, to cause the knife carrier to move in an elliptical path.

34. A sole rounding machine comprising, in combination, two heads; a knife and work-support on said heads respectively; provision for perpendicular slots in one head; blocks to coöperate with the slots, connected to the other head; and power actuating means to move one head to cause a relative sole cutting motion of the heads.

35. A sole rounding machine comprising, in combination, a work supporting head having slots intersecting at right angles, means for rotating said head, an opposed head, a knife connected thereto and having a block slidable in each of said slots, a slot in the opposed head and a fulcrum block slidable in said slot and pivoted to a stationary part of the machine to cause the knife carrier to move in an elliptical path.

36. A sole rounding machine comprising, in combination, two heads, one supporting the other, a work support connected with one, a knife connected with the other, means for preventing other than rotary motion of one of them, and means for rotating one of said heads to produce an elliptical motion in the other.

37. A sole rounding machine comprising, in combination, a knife carrier, a work support, a presser head, means for clamping the head and support, means independent of the clamping means for locking the head and support in clamped relation, and means for producing relative motion between the carrier and support.

38. A sole rounding machine comprising, in combination, a work support, a presser head, means controlled by the operator for clamping the support and head together, and means also controlled by the operator upon operation, of the clamping means to separately transmit positive rotative movement to both the presser head and the holder.

39. A sole rounding machine comprising in combination, a work holder, a presser head, means controlled by the operator for clamping the holder and head together, a shaft, separate driving connections between said shaft and work holder and the presser head to transmit positive rotative movement to both the work holder and presser head, and means for operating the shaft, said means being controlled by the operator by continued movement of the clamp operating means subsequent to the completion of the clamping movement.

40. A sole rounding machine comprising, in combination, a rotatable head, having slots at right angles, means for rotating said head, a pattern supported over one of the slots in longitudinal alinement therewith, a knife carrier opposed to the slotted head and having blocks slidable in the slots, said carrier provided with a slot, block carriers for said blocks, and a fulcrum block slidable in the slot of the knife carrier and pivoted to the frame of the machine to cause the knife carrier to move in an elliptical orbit having high speeds when moving in the directions of the length of the pattern and slow speeds when moving transversely thereto.

41. A sole rounding machine comprising, in combination, a slotted knife carrier; a casing over said carrier; a slotted head movably supported between the carrier and the casing; and connections slidable in relation to the slotted head and arranged to permit relative movement between the head and the carrier.

42. The combination in a sole rounding machine of a head, a work holder connected with said head, means for rotating the head, a presser head, means for rotating the presser head simultaneously with the work support, means for clamping the work holder and presser head, together, a knife carrier, a knife connected thereto, transmitting means intermediate the head and knife carrier whereby the knife is moved in an elliptical path by the rotation of said head.

43. A sole rounding machine comprising, in combination, a casing secured to the machine top, opposed heads movably supported between the casing and top, a knife connected with one of the heads, a work support with the other, means for rotating the head having the work support connected therewith, and transmitting means intermediate the opposed heads whereby the knife carrier is moved in an elliptical orbit.

44. A sole rounding machine comprising, in combination, clamping means arranged to clamp a sole blank; pattern means; means to rotate the clamping means and sole blank; a cutter; and means to move the cutter along the pattern to contribute to the cutting operation.

45. A sole rounding machine comprising, in combination, a work holder; pattern means; a presser head; means for clamping the head and holder; means to rotate the holder; a cutter; and means for moving it along the pattern means to contribute to the cutting operation.

46. A sole rounding machine comprising, in combination, a work holder; pattern means; a presser head; means for clamping the head and the holder; means to rotate the holder; a cutter; and means for moving the cutter along the pattern means in a direction opposite to that of the rotation of the holder, to contribute to the cutting operation.

47. A sole rounding machine comprising, in combination, a work support; cutting means; mechanism to move the work support past the cutting means; and actuating means to impart cutting movement to the cutting means in a direction opposite to that of the work support.

48. A sole rounding machine comprising, in combination, a work support; cutting means; and actuating mechanism for said work support and cutting means constructed and arranged to cause a resultant movement of the cutting means in an elliptical path, said mechanism including means for moving the cutting means in opposite directions in said path.

49. A sole rounding machine comprising, in combination, a support for a sole; cutting means; means to move the sole past the cutting means; and mechanism for moving the cutting means along a path substantially parallel to the edge of the sole.

50. A sole rounding machine comprising, in combination, a knife carrier; means for moving the same in an elliptical orbit; a sole carrier; means to move the same; and adjusting devices for varying the movement of one of said carriers and thereby changing the resultant path of relative movement of the carriers to correspond to different sole sizes.

51. A sole rounding machine comprising, in combination, a slotted head; a knife connected thereto; means to move the knife in an elliptical path, including blocks adjustably mounted in the slotted head to vary the dimensions of the elliptical path; and means for moving the work to present it to the knife, the resultant relative movement of the knife and work constituting a sole cutting movement.

52. A sole rounding machine comprising, in combination, a head; a screw mounted thereon having threads of different pitch; blocks mounted on the threads; a cutter connected with said head; means connected with said blocks for moving the cutter; and provision to permit adjustment of the screw to vary the movement of the cutter.

53. A sole rounding machine comprising, in combination, a head having a slot; blocks slidable in said slot; a screw threaded through the blocks; means associated with said blocks for producing movement of the head in an endless path; and means permitting the screw to be turned to adjust the positions of the blocks in said slot to adapt said motion to different sizes of soles.

54. A sole rounding machine comprising, in combination, a clamp; a brake; a power clutch; means to operate them; a locking device to hold them in position; and a holding dog arranged to act as a strut between the locking device and the frame of the machine to render the locking device inoperative and the machine operations controllable at will.

55. A sole rounding machine comprising, in combination a knife carrier, a head having slots intersecting at right angles, a casing covering and clamping said head, means for moving the head, blocks on the carrier and slidable in the slots of said head to cause the knife carrier to move relatively to the head.

56. A machine of the class described comprising, in combination, provision for a moving piece of work; a tool; and mechanism to move the tool in the same direction in which the work is moved, at a speed less than that of the work, and to move the tool in the opposite direction.

57. A machine of the class described, arranged to operate upon a moving piece of work, comprising in combination, a moving tool; and means to reciprocate the tool to accelerate the action of the tool on the work, according to the direction of its reciprocation.

58. A machine of the class described comprising, in combination, means to rotate a piece of work; a tool; and means controlled by rotation of the work to move the tool in an elliptical path, the resultant relative movement of the rotating work and the elliptically moving tool defining approximately the line on which the tool acts upon the work.

In testimony whereof, I have signed my name to this specification, in the presence of two subscribing witnesses.

JOHN J. HEYS.

Witnesses:
W. CARPENTER,
J. E. LEAVETT.